Oct. 3, 1967

J. R. YOUNG 3,344,618

SAFETY SHIELD

Filed June 30, 1965

INVENTOR

JOHN R. YOUNG

BY Strauch, Nolan, Neale,
Nies & Bronaugh
ATTORNEYS

Oct. 3, 1967 J. R. YOUNG 3,344,618
SAFETY SHIELD
Filed June 30, 1965 2 Sheets-Sheet 2

INVENTOR
JOHN R. YOUNG
BY Strauch, Nolan, Neale, Nies & Bronaugh
ATTORNEYS

United States Patent Office 3,344,618
Patented Oct. 3, 1967

3,344,618
SAFETY SHIELD
John R. Young, Allegan, Mich., assignor to Rockwell-Standard Corporation, Pittsburgh, Pa., a corporation of Delaware
Filed June 30, 1965, Ser. No. 468,291
20 Claims. (Cl. 64—3)

This invention relates to a safety shield assembly for exposed rotatable power transmitting mechanism and more particularly to a shield assembly particularly adapted for operator protection from an exposed axially rotating universal joint and drive shaft assembly such as is used in the transmission of power from an agricultural tractor to implements connected thereto.

While shields of various constructions have heretofore been proposed for the general purpose of operator protection most of these shields embody objectional features such as added weight, tendency to interfere with shaft rotation when deformed, rusting and eventual looseness and noise during operation. The present invention provides an entirely novel light-weight shield assembly easily attached and demounted and free of foregoing objections which has a longer useful life than known shields.

It is therefore the major object of the invention to provide an improved safety shield assembly for an exposed rotating power transmission assembly for the protection of the operator when such assembly is driven.

It is another object of the present invention to provide such a safety shield assembly mounting on the power transmission assembly that it normally rotates with the shafts and connections comprising the assembly but may cease to rotate if accidentally arrested by contact with the operator or some external object, and such cessation of the shield assembly rotation will not interfere with continued rotation of the assembly.

Another object resides in providing such a safety shield assembly wherein the shield components are made of relatively flexible non-metallic materials, such as polyethelene, to allow for a rigid interlocked assembly of the shield components without bonding or welding, said assembly to be capable of ready manual disassembly and reassembly for replacement of damaged components and for servicing.

A further object is to provide an improved plastic safety shield assembly to replace hitherto conventional metal shield assemblies, the use of non-metallic materials making the improved shield assembly economical to manufacture and resulting in a weight reduction, a noise reduction, elimination of shield rusting, and a reduction of a tendency of the shield tubes to bind during telescoping.

Another object resides in the provision of an improved safety shield assembly wherein the partial flexibility inherent in the selected non-metallic plastic materials utilized in said improved assembly allows for operational bending and twisting without permanent damage.

A further object is to provide a single shield component to fuction conjuctively as a universal joint housing, the bearing, and the means of locking the housing means to the shield tubes.

It is a further object to provide a novel non-metallic bearing and locking means whereby a shield assembly can be coupled to the yoke of a universal joint.

Another object resides in the provision of a hinged window flap in the sidewall of the outer non-metallic shield tube of such an assembly, said flap to be integral with the outer tube, thereby eliminating the need for an open hole in the shield tubes for access to driving sleeve lubrication fitting.

Other objects and novel features will become evident or will be specifically pointed out by the following description in connection with the annexed claims and the appended drawings in which:

Similar reference numbers are applied to corresponding parts throughout all figures.

Figure 1:
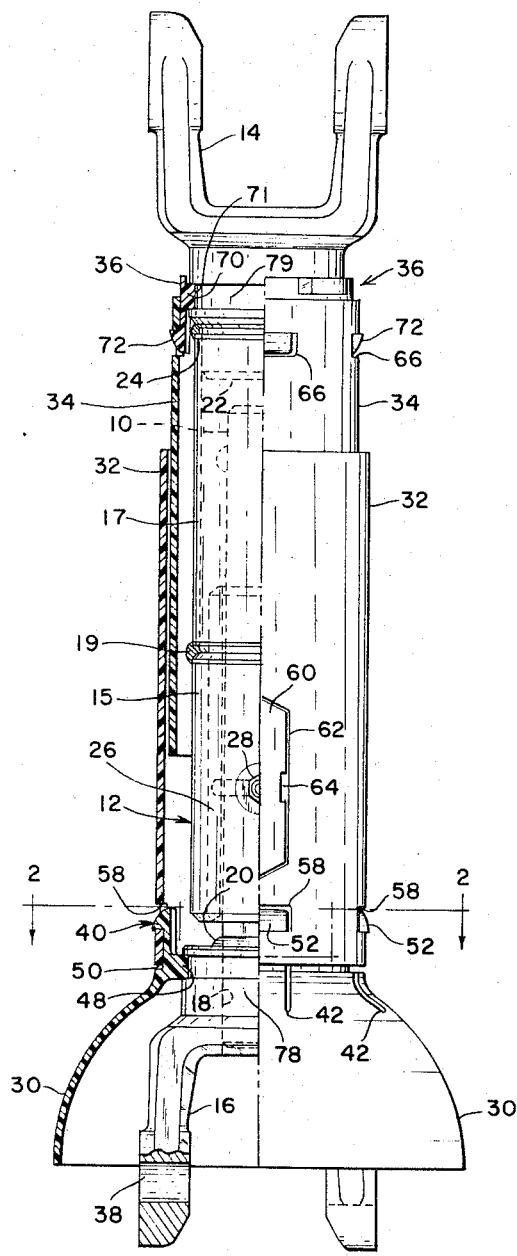
FIGURE 1 is a longitudinal half-sectional elevational view showing a power transmitting assembly with mounted shield assembly according to a preferred embodiment of the invention.
Figure 8:
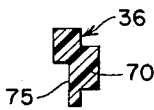
FIGURE 8 is an enlarged section taken substantially along line 8—8 of FIGURE 7.
Figure 9:
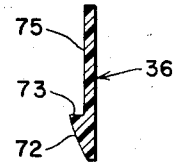
FIGURE 9 is an enlarged section taken substantially along line 9—9 of FIGURE 8.
Figure 7:
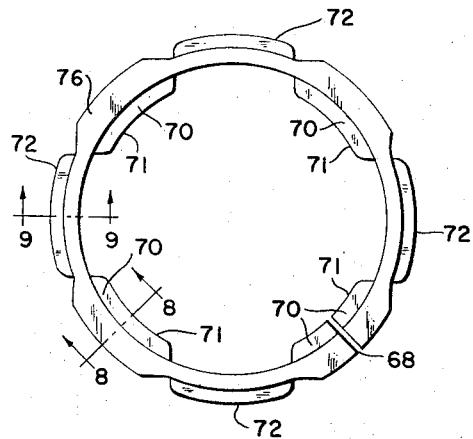
FIGURE 7 is an end view of the shield member of FIGURE 6 taken substantially along line 7—7 of FIGURE 6.

With particular reference to FIGURE 1, there is shown centered within the assembly a conventional torque transmitting drive mechanism as is used on agricultural tractors to drive attached implements. This mechanism consists essentially of a solid shaft 10, a surrounding sleeve shaft 12 and two flanger universal joint yokes at 14 and 16.

Figure 2:
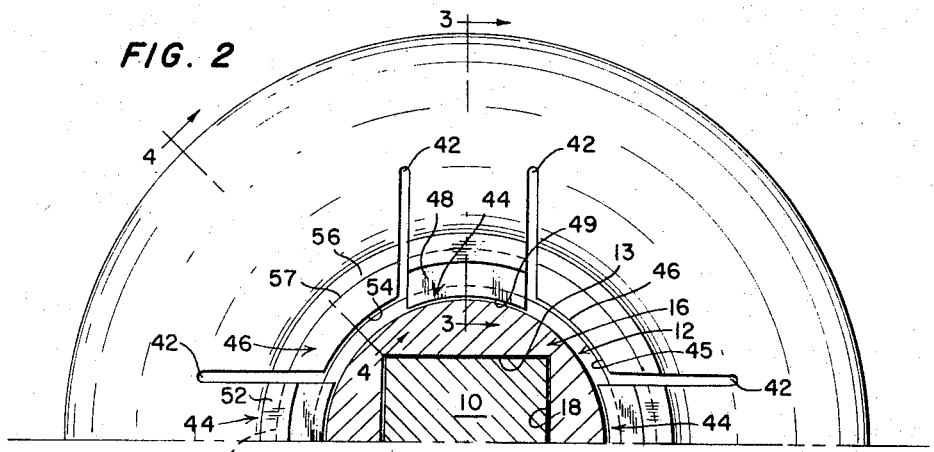
FIGURE 2 is an end view in section taken substantially along line 2—2 of FIGURE 1 and showing only the upper half of the assembly, the lower half being identical.

Solid shaft 10 as shown in FIGURE 2 is of rectangular cross-section, and the end of shaft 10 extends non-rotatably into a similarly shaped opening in the hub 18 of universal joint yoke 16. Shaft 10 is secured to yoke 16 as by a continuous weld 20 about its periphery so that yoke 16 is integral with shaft 10.

Sleeve shaft 12 has a hollow rectangular bore 13 at one end similar in shape to shaft 10 but slightly larger so as to slidably telescopically receive shaft 10. The other end of sleeve shaft 12 extends over the hub 22 of universal joint yoke 14 and is secured thereto as by a continuous peripheral weld 24. Thus sleeve shaft 12 is integral with yoke 14. A longitudinal race groove 26 is provided between the shafts 10 and 12 to house a ball-bearing slip joint. A lubrication fitting 28 is provided as a means for greasing this slip joint.

The foregoing shaft and yoke assembly may be more or less conventional in such power transmitting assemblies, the power being transmited solidly by reason of the non-circular rectangular fit of shafts 10 and 12, and the longitudinal slide connection between the shafts permitting the necessary changes in shaft assembly length as required by operational conditions without interfering with power transmission. In practice, shaft 12 may comprise a thicker section 15 containing bore 13 and slidably receiving shaft 10, with a thinner section 17 fitted at one end onto the reduced end of section 15 and welded to section 15 as by ringweld 19. The other end of section 17 is welded to the joint yoke at 24.

Concentrically enclosing the power transmission assembly is a non-metallic safety shield assembly which comprises a bell-shaped shield member 30 at one end, an outer shield tube 32 telescopically extending over an inner shield tube 34, and a split bearing member 36 at the other end. In some shield assemblies, where it is necessary or desirable, the split bearing member 36 may be replaced by a bell-shaped shield member such as that at 30 as they are both attached to the shield tubes and yokes in like manner as will appear.

With reference to FIGURES 1 and 2, the bell-shaped shield member 30 is made of a durable, semi-rigid oil, flexible water and abrasion resistant non-metallic plastic, such as polyethylene. Its outer effective shielding diameter is at a maximum directly over the knuckle 38 of yoke 16 and tapers inwardly to form a bell-shaped housing over that yoke. Extending longitudinally from the small end of this bell-shaped portion of the shield 30 is an integral collar 40.

Collar 40 is formed with a series of eight circumferentially spaced slots 42 that extend from the extreme right of the sleeve member into the walls of the bell-like portion of shield 30, thereby resulting in the formation of eight relatively flexible tab-like segments which due to different cross-sectional configurations and functions are alternately designated as the bearing segments 44 and the non-bearing segments 46. The inner ends of alternate pairs of slots are connected by segmental circumferentially extending recesses 45.

Figures 3, 4:
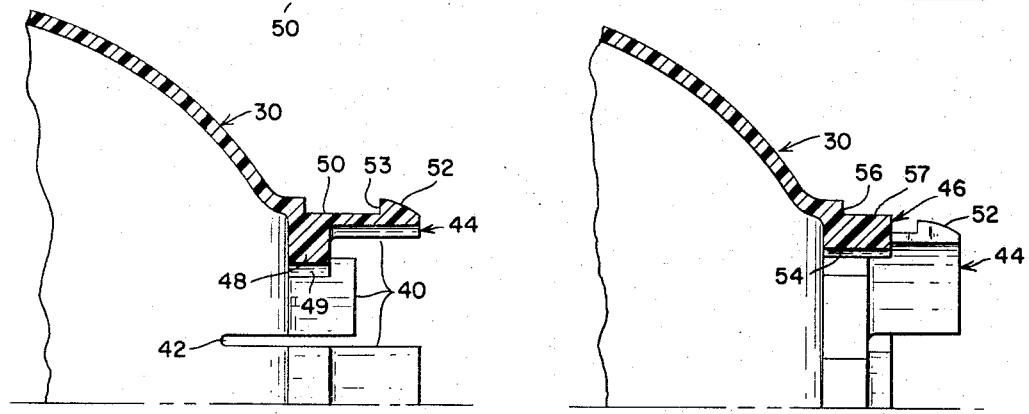
FIGURE 3 is a section taken substantially along line 3—3 of FIGURE 2 showing the shield end structure in enlarged detail.
FIGURE 4 is a section taken substantially along line 4—4 of FIGURE 2 showing another enlarged detail of the shield end structure.

Taking the partial section of FIGURE 3 as typical of all the bearing segments 44, the inner wall of each segment 44 is stepped to form a radially inwardly projecting bearing flange 48 having an arcuate surface 49. The outer surface of each segment 44 is formed with an arcuate lock groove 50 and a barb-like locking lobe 52, having a rear edge 53 that forms one side of groove 50. The flanges 48, grooves 50 and lobes 52 are circumferentially aligned in the several segments 44. The grooves 50 lie in a cylindrical envelope for sliding interfit with the interior of tube 32 as shown in FIGURE 1.

Taking the partial section of FIGURE 4 as typical of all of the non-bearing segments 46, the arcuate inner surface 54 of each segment 46 is smooth and regular, and the outer surface is stepped to form an axially facing shoulder 56 and an arcuate surface 57 that is disposed in the same cylindrical envelope as grooves 50. The arcuate surfaces 54 and 57 of the several segments 46 are in circumferential alignment. The significance of the differences between the two alternate set of segments will become apparent as the disclosure proceeds.

Figure 5:
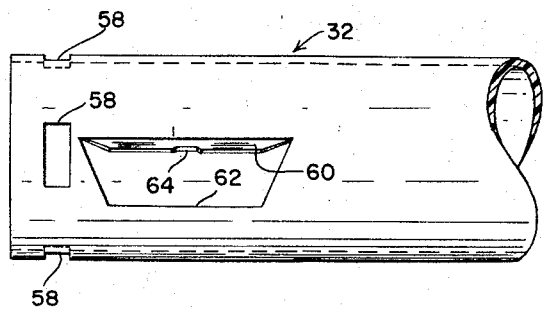
FIGURE 5 is a fragmentary partial and sectioned elevation showing the outer shield tube window.

As shown in FIGURE 5, the outer shield tube 32 which is preferably a uniform wall thickness cylinder is made also of a durable, relatively rigid plastic such as polyethylene. Four through slots 58 of uniform width and length are equally spaced circumferentially about the periphery of tube 32 at one end. The arc length of each slot 58 is slightly larger than the arc length of a bearing lobe 52. These slots are prepunched in the tube wall.

Also provided in the sidewall of tube 32 as an optional feature is a hinged window flap 60 (see FIGURE 5). The hinged flat is integral with the tube and is made by compresesing the tube wall in this area to approximately one-half of its original thickness. Flap 60 is punched off center to produce an angle cut in the wall at the opening edge 62 of the window to produce an interference to opening the flap, thereby assuring a normally closed position. The trapezoidal shape allows the telescoping inner tube 34 to wedge the flap 60 flush with the parent tube's outer surface should the flap become bent inwardly.

A screwdriver notch 64 is provided to facilitate opening of flap 60. The purpose of the hinged flap 60 is to allow access by a grease gun to the lubrication fitting 28. The closed flap prevents the entrance of dirt into the assembly by eliminating the usual open lubrication access holes found in the side walls of conventional shield tubing.

The inner shield tube 34 is also a uniform wall thickness cylinder but of smaller diameter than tube 32. Tube 34 is also made of a durable, semi-rigid plastic such as polyethylene, and has put into its periphery a series of four equally-spaced circumferentially disposed slots 66, similar to slots 58 of tube 32.

The remaining component in the safety shield assembly of the invention is the split bearing assembly 36 shown in detail in FIGURES 6–9. This member 36 is also non-metallic being made of a durable semi-rigid tough flexible acetal resin plastic such as that known in the trade as Delrin.

Figure 6:
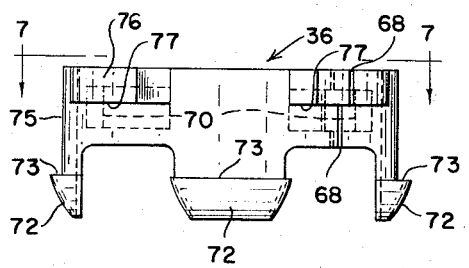
FIGURE 6 is a side elevation showing a split shield bearing member.

Member 36 is an annulus longitudinally split by slot 68 so that it may be readily sprung open and closed when being mounted upon yoke 14. Four bearing flanges 70 extend inwardly from its inner walls, and are formed with circumferentially aligned arcuate surfaces 71. Four external stepped locking lobes 72 of barb-like cross-section extend axially outwardly from the annulus as shown in FIGURE 6. Each lobe 72 has a rear locking ledge 73. The outer surface 75 of member 36 is cylindrical and has a snug sliding fit with the interior of tube 34 as shown in FIGURE 1.

At the end opposite lobes 72, member 36 is formed with four equally circumferentially spaced external radial projections 76 each having an axially facing stop shoulder 77.

Yoke 16 is formed with an annular recess 78 sized to snugly receive bearing flanges 48, for mounting the bell member 30 upon yoke 16. Yoke 14 is formed with an annular recess 79 for snugly receiving bearing flanges 70 of member 36, for mounting member 36 on yoke 14. Tube 32 is mounted on bell member 30, with the inner periphery of the tube end extending around lock grooves 50 and lobes 40 disposed in slots 58. Tube 34 is mounted on member 36 with its inner periphery extending around surface 75 and its slots 66 interfitting with lobes 72. Thus the concentric tubes 32 and 34 are fixedly mounted at opposite ends of the shaft assembly and project toward each other, being telescoped over a large portion of their length to baffle against the entry of dust, dirt and water.

Assembly of the unit shown in FIGURE 1 usually begins with the welding of the solid shaft 10 to flanged yoke 16 and the welding of the sleeve shaft 12 to flanged yoke 14. Before telescoping these two metal shafts together, the safety shield components are incorporated. The bell-shaped plastic shield member 30 is placed over solid shaft 10, its four bearing segments 44 being manually flexed to a larger diameter, this being possible due to the relative flexibility of the plastic selected and the slots 42, until the inwardly projecting bearing flanges 48 clears the end of the yoke and then bearing flanges 48 are pressed down in frictional engagement with the circumferential yoke recess 78. The non-bearing segments 46 which do not have these inwardly extending projections 48 need not be flexed to a larger diameter as the bell-shaped shield member is slid over the flanged hub. Thus the only surfaces brought into contact with the yoke are the four bearing flange surfaces 48 eventually inserted into recess 78.

The outer plastic shield tube 32 is now threaded over the solid shaft 10 and its four circumferentially disposed slots 58 are aligned with the leading chamfers of lobes 52 of bearing segments 44. Tube 32 is then axially forced over the chamfered lobe edges depressing the lobes until the tube inner diameter surface clears the lobe trailing edge 53 at which time the four lobes spring into tube slots 58 and the segments of the tube located between its end surface and the slots fit snugly upon the lock grooves 50, this action resulting in firmly mounting shield tube 32 on the bell-shaped shield member 30 and locking these two parts together. Shoulder 56 of the non-bearing segments 46 limits further axial movement of the shield tube.

The bell-shaped shield member serves functionally as the protective housing around the rotating yoke, provides its own bearing means between its shell and the yoke, and provides its own locking means for mounting the shield tube thereupon.

Now the other end is assembled. Member 36 is slipped over and along sleeve shaft 12, spread open to pass over the flanged hub 22 of yoke 14 and is located in the circumferential recess 79 of the yoke 14, at which time the spreading force is released and the bearing flanges 70 snugly frictionally conform into the recess 79. As with the bell-shaped shield member 30, the only surfaces of the split bearing member 36 brought into contact with yoke 14 are bearing flange surfaces.

Now the inner shield tube 34 is slipped over the sleeve shaft 12 until the four circumferentially disposed slots 66 are aligned with the leading chamfer of locking lobes 72, and forced axially over the lobes depresing them until the inner diameter surface of the tube clears the lobe trailing edge 73 (FIGURE 9) at which time flexible lobes spring out into the slots and the wall of the inner shield tube contracts to conform snugly around surfaces 75 (FIGURE 8) of the split bearing member, thereby firmly mounting the tube 34 on split bearing member 36 and locking the two together.

To complete assembly, it is now only necesary to operatively engage the two shaft sections, the solid shaft 10 being telescopically inserted into the bore of sleeve shaft 12, and the inner shield tube 34 telescoping with the outer shield tube 32.

Disassembly of the improved safety shield assembly for servicing or replacement of damaged components is made relatively easy. It requires first axial separation of the two shaft and tube sections which can be manually accomplished. To free either shield tube from its mounting member 30 or 36, the four locking lobes must be depressed below the shield tube inner diameter so that the shield tube may be axially pulled until free. To remove the bell-shaped member 30 from yoke 16 it is only necessary to expand it sufficiently to remove the bearing flanges 48 from yoke recess 78 and slide it over the hub of the flanged yoke. Split bearing member 36 is similarly removed from yoke 14 by expanding it and sliding it over the hub of the yoke. All these various disassembly steps, as with the various assembly steps, can be accomplished manually without the aid of special tools.

As to the prime function of the improved safety shield assembly, that of safeguarding the operator from damage by the rotating shafts or yokes, the connection of the shield assembly to the drive mechanism is such that the shield assembly comprising mounting members 30 and 36 and tubes 32 and 34 normally rotates in unison with the drive mechanism, there being in normal operation sufficient frictional drag between the polyethylene bearing flange surfaces and the steel recess surfaces to assure such rotation, thereby minimizing wear on the bearing surfaces.

In the event that the operator or some other external object comes into contact with the shield assembly, the force exerted against the shield easily overcomes the frictional drag between the bearing surfaces of the mounting members and the yokes which slows or even arrests rotation the safety shield assembly without interfering with shaft rotation while preventing injury to the operator and eliminating the danger of his clothing becoming wrapped about the assembly. Thus, the safety shield assembly performs its function without interfering with operation of the drive shaft.

The use of non-metallic materials in making the safety shield has many advantages, chiefly among which are lower manufacturing costs, weight reduction so that no off-center loads are mounted on the rotating shaft assembly, noise reduction, elimination of rusting problems, and a reduction of any tendency of the shield tubes to bind due to intersurface friction during telescoping. Plastic to plastic contact of tubes 32 and 34 is almost frictionless. These are distinct improvements over hitherto used metal shield tubes. When metal shield components are utilized, there is also a tendency for permanent bending and twisting of the shield tubes during normal operation which often produces damage during future use. The use of suitable flexible, self-supporting and shape retaining plastics with their inherent tendency to return to given shape and location greatly minimizes this problem by allowing for some temporary operational bending and twisting without permanent distortion.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. For use with a power transmitting shaft assembly of the type wherein two shaft sections extend from longitudinally spaced end portions into longitudinally slidable non-rotatable engagement, a shield assembly comprising annular mounting members adapted to be frictionally mounted on said end portions, and tubular members of different diameter having separable snap-fit direct end attachment to the respective mounting members so as to extend toward each other into telescoped relation surrounding said shaft sections, each said mounting member and the tubular member secured thereto being adapted to normally rotate with its associated shaft section but said frictional mounting permitting unimpeded rotation of the shaft assembly should contact by an operator or the like with the shield assembly tend to arrest rotation of said shield assembly.

2. The invention defined in claim 1, wherein all of said mounting and tubular members are integral structures made from flexible but shape retaining durable non-metallic plastic.

3. In association with a power transmitting shaft assembly of the type wherein two shaft sections extend from longitudinally spaced end portions into longitudinally slidable non-rotatable engagement, the improvement comprising a shield assembly consisting essentially of annular mounting members frictionally mounted directly on said end portions, and tubular members of different diameter having separable snap-fit direct end attachment to the respective mounting members and extending toward each other into telescoped relation surrounding said shaft sections, each said mounting member and the tubular member secured thereto normally rotating with its associated shaft section but said frictional mounting permitting unimpeded rotation of the shaft assembly should contact by an operator or the like with the shield assembly tend to arrest rotation of said shield assembly.

4. For use with a power transmitting shaft assembly of the type wherein two shaft sections extend from longitudinally spaced end connection portions into longitudinally slidable non-rotatable engagement, a shield assembly comprising annular mounting members adapted to be frictionally mounted but held against longitudinal shaft on said end connections, and tubular members of different diameter secured to the respective mounting members and extending toward each other into telescoped relation surrounding said shaft sections, each said tubular member being secured directly upon its associated mounting member by cooperating snap-fit formations that interlock upon relative longitudinal movement, and each said mounting member and the tubular member secured thereto normally rotating with its associated shaft section but said frictional mounting permitting unimpeded relative rotation of said shaft assembly and shield assembly should an external object tend to arrest rotation of said shield assembly.

5. For use with a power transmitting shaft assembly of the type characterized by two shaft sections extending from longitudinally spaced end connecting members into longitudinally slidable non-rotatable engagement and each of said end members has an annular recess, the improvement comprising a shield assembly having annular mounting members of lightweight plastic material frictionally mounted in said recesses on said end connections, and tubular members of different diameter and made of lightweight plastic material having separable snap-fit direct end attachment to the respective mounting members and extending toward each other into telescoped relation surrounding said shaft sections, each said mounting member and the tubular member secured thereto being adapted for normally rotating with its associated shaft section but said frictional mounting permitting unimpeded rotation of said shaft assembly should contact by an operator or the like with the shield assembly tend to arrest rotation of said shield assembly.

6. A shield assembly adapted for mounting upon a power transmitting shaft assembly of the type wherein two shaft sections extend from longitudinally spaced end portions into longitudinally slidable non-rotatable engagement, said shield assembly comprising annular mounting members adapted to be frictionally mounted on said end portions, and tubular members of different diameter detachably directly interlocked with and supported by the respective mounting members and extending toward each other into telescoped relation for surrounding said shaft sections, said tubular members each having an endwise snap-fit connection with its associated mounting member and each said mounting member and the tubular member secured thereto normally rotating with its associated shaft section but said frictional mounting permitting unimpeded rotation of said shaft assembly should contact with an operator or the like with the shield assembly tend to arrest rotation of said shield assembly.

7. The shield assembly defined in claim 6, wherein said annular mounting members and said tubular members are integral non-metallic plastic elements.

8. A shield component mounting member for association with a power transmitting shaft assembly comprising a one-piece annular element made of flexible but shape retaining non-metallic plastic, said element having internally projecting bearing flange means for rotatable slip-frictional mounting on the shaft assembly and a plurality of axially projecting flexible detents for lockingly attaching a shaft surrounding tube.

9. The shield component defined in claim 8, wherein said element is formed axially adjacent said detent means with a cylindrical surface adapted to engage the interior of said tube and axially facing stop shoulder means for limiting axial movement of a tube attached thereto by said detents.

10. The shield component defined in claim 9, wherein said shoulder means comprises a ledge on said detent means.

11. The shield component defined in claim 9, wherein said shoulder means comprises an axially spaced integral formation projecting upwardly from said cylindrical surface.

12. The shield component defined in claim 8, wherein said element is formed with an integral bell-shaped portion extending oppositely to said detents to surround part of the shaft assembly.

13. In combination, a power transmitting shaft assembly comprising longitudinally spaced universal joint yokes each having an annular recess, longitudinally extensible shaft means interconnecting said yokes, a shield mounting member frictionally mounted on each yoke by internal flange means extending into the associated recess, and two tubular shield members of different diameter directly separably attached by axially interlocking cooperating formations to the respective mounting members and extending in opposite directions toward each other in telescoping relation surrounding said shaft means, said tubular shield members each having an endwise snap-fit connection with its associated mounting member.

14. In the combination defined in claim 13, said frictional mounting of the shield mounting members on the yokes permitting relatively unimpeded rotation of the shaft assembly should an external object exert a braking effect on said shield.

15. The combination defined in claim 13, wherein said shield mounting and tubular shield members are one-piece integral elements made of durable flexible but shape retaining plastic.

16. For use with a power transmitting shaft assembly of the type wherein two shaft sections extend from longitudinally spaced end connection portions into longitudinally slidable non-rotatable engagement, a shield assembly comprising annular mounting members adapted to be frictionally mounted but held against longitudinal shift on said end connections, and tubular members of different diameter secured to the respective mounting members and extending toward each other into telescoped relation surrounding said shaft sections, said mounting members being provided with flexible lobes and each of said tubular members being formed for axial slip fit upon its associated mounting member and with apertures lockingly receiving said lobes, and each said mounting member and the tubular member secured thereto normally rotating with its associated shaft section but said frictional mounting permitted unimpeded relative rotation of said shaft assembly should an external object tend to arrest rotation of said shield assembly.

17. For use with a power transmitting shaft assembly of the type characterized by two shaft sections extending from longitudinally spaced end connecting members into longitudinally slidable non-rotatable engagement and each of said end members has an annular recess, the improvement comprising a shield assembly having annular mounting members of lightweight plastic material frictionally mounted in said recesses on said end connections, and tubular members of different diameter and made of lightweight plastic material secured to the respective mounting members and extending toward each other into telescoped relation surrounding said shaft sections, each of said mounting members having integral detents flexibly mounted and projecting axially therefrom, and each of said tubular members having apertures lockingly receiving said detents, and each said mounting member and the tubular member secured thereto being adapted for normally rotating with its associated shaft section but said frictional mounting permitting unimpeded rotation of said shaft assembly should contact by an operator or the like with the shield assembly tend to arrest rotation of said shield assembly.

18. In the shield component mounting member defined in claim 8, said bearing flange means comprising a plurality of circumferentially spaced flanges having their inner surfaces disposed in a common cylindrical envelope.

19. In combination, a power transmitting shaft assembly comprising longitudinally spaced universal joint yokes each having an annular recess, longitudinally extensible shaft means interconnecting said yokes, a shield mounting member frictionally mounted on each yoke by internal flange means extending into the associated recess, and two tubular shield members of different diameter directly separably attached by axially interlocking cooperating formations to the respective mounting members and extending in opposite directions toward each other in telescoping relation surrounding said shaft means, one of said mounting members having an open bell-shaped portion extending over the associated yoke.

20. In combination, a power transmitting shaft assembly comprising longitudinally spaced universal joint yokes each having an annular recess, longitudinally extensible shaft means interconnecting said yokes, a shield mounting member frictionally mounted on each yoke by internal flange means extending into the associated recess, and two tubular shield members of different diameter directly separably attached by axially interlocking cooperating formation sto the respective mounting members and extending in opposite directions toward each other in telescoping relation surrounding said shaft means, said formations comprising flexible detents and related detent receiving apertures in the associated members.

References Cited

UNITED STATES PATENTS

| | | | |
|---|---|---|---|
| 2,772,550 | 12/1956 | Harrington | 64—4 |
| 3,031,865 | 5/1962 | Weasler | 64—3 |
| 3,080,731 | 3/1963 | Atkinson | 64—4 |
| 3,082,642 | 3/1963 | Hammerand. | |
| 3,091,101 | 5/1963 | Atkinson | 64—4 |
| 3,194,615 | 7/1965 | Weasler | 64—3 X |

FOREIGN PATENTS 899,511  6/1962  Great Britain.

FRED C. MATTERN, JR., *Primary Examiner.*

HALL C. COE, *Examiner.*